United States Patent
Naito et al.

(10) Patent No.: US 8,871,849 B2
(45) Date of Patent: Oct. 28, 2014

(54) THERMOPLASTIC RESIN COMPOSITION AND MOLDED PRODUCT THEREOF

(75) Inventors: Yoshiyasu Naito, Ichihara (JP); Daisuke Kuwahara, Ichihara (JP); Takamasa Owaki, Ichihara (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/981,675

(22) PCT Filed: Feb. 13, 2012

(86) PCT No.: PCT/JP2012/053223
§ 371 (c)(1),
(2), (4) Date: Jul. 25, 2013

(87) PCT Pub. No.: WO2012/111587
PCT Pub. Date: Aug. 23, 2012

(65) Prior Publication Data
US 2013/0310502 A1 Nov. 21, 2013

(30) Foreign Application Priority Data

Feb. 15, 2011 (JP) .................................. 2011-029621
Nov. 24, 2011 (JP) .................................. 2011-256041

(51) Int. Cl.
| | | |
|---|---|---|
| *C08K 3/32* | (2006.01) | |
| *C08L 67/04* | (2006.01) | |
| *C08L 55/02* | (2006.01) | |
| *C08L 25/12* | (2006.01) | |
| *C08L 51/04* | (2006.01) | |

(52) U.S. Cl.
CPC ........... *C08L 67/04* (2013.01); *C08K 2003/329* (2013.01); *C08L 2205/035* (2013.01); *C08L 55/02* (2013.01); *C08L 2205/02* (2013.01); *C08L 25/12* (2013.01); *C08K 3/32* (2013.01); *C08L 51/04* (2013.01); *C08L 2205/03* (2013.01); *C08K 2003/324* (2013.01)
USPC .......................................................... 524/417

(58) Field of Classification Search
USPC .......................................................... 524/417
See application file for complete search history.

(56) References Cited

U.S. PATENT DOCUMENTS

| | | | |
|---|---|---|---|
| 6,989,190 B2 * | 1/2006 | Gaggar et al. ................. | 428/220 |
| 2007/0282045 A1 * | 12/2007 | Volkers et al. ................. | 524/261 |
| 2009/0054568 A1 | 2/2009 | Uejima et al. | |
| 2010/0010141 A1 | 1/2010 | Nakamura et al. | |
| 2010/0144938 A1 | 6/2010 | Seidel et al. | |
| 2010/0160505 A1 | 6/2010 | Kumazawa et al. | |

FOREIGN PATENT DOCUMENTS

| | | |
|---|---|---|
| CN | 1130645 A | 9/1996 |
| CN | 101724229 | 6/2009 |
| CN | 101724229 A | 6/2010 |
| JP | 7-33933 A | 2/1995 |
| JP | 2004-204194 A | 7/2004 |
| JP | 2007-191688 A | 8/2007 |
| JP | 2007-254507 A | 10/2007 |
| JP | 2008-222790 A | 9/2008 |
| JP | 2009-120725 A | 6/2009 |
| JP | 2012-511060 A | 5/2012 |
| WO | WO 2007/129437 A1 | 11/2007 |

OTHER PUBLICATIONS

International Search Report for PCT/JP2012/053223 mailed on Apr. 17, 2012.

* cited by examiner

*Primary Examiner* — Peter Szekely
(74) *Attorney, Agent, or Firm* — Birch, Stewart, Kolasch & Birch, LLP

(57) ABSTRACT

The present invention relates to a thermoplastic resin composition obtained by compounding phosphoric acid and/or monosodium phosphate (D) with a resin composition including a styrenebased resin (A), a graft copolymer (B), and an aliphatic polyester resin (C), wherein the thermoplastic resin composition is excellent in mechanical properties (e.g., impact resistance) and thermal stability, and, in addition, can be molded without any problem in terms of safety and hygiene.

11 Claims, No Drawings

THERMOPLASTIC RESIN COMPOSITION AND MOLDED PRODUCT THEREOF

TECHNICAL FIELD

The present invention relates to a thermoplastic resin composition that is environmentally-friendly and excellent in impact resistance, durability to heat holding (hereinafter also referred to as thermal stability), and further molding processability, and a molded product made thereof.

BACKGROUND ART

Conventional molding materials such as polyethylene resin, polypropylene resin, nylon resin, polyester resin, ABS resin, polycarbonate resin, and polyacetal resin have been used in every field. Used products have been landfilled or incinerated, and, therefore, have put significant burden on the global environment, such as semipermanent stay in the ground or generation of carbon dioxide during incineration. In recent years, increased concentration of carbon dioxide, a greenhouse gas, in the atmosphere has been pointed out as a cause of global warming, and the movement for global-scale reduction of carbon dioxide emission is gathering momentum.

From the viewpoint of such environmental protection, utilization of biomass has received attention and substitution for fossil resource materials has been investigated. Also for molding materials, plant-derived resins, which allow reduction in use of fossil resources and reduction of carbon dioxide emission, has received attention. A representative plant-derived resin is an aliphatic polyester resin including a polylactic acid resin. However, the aliphatic polyester resin, compared to the existing petroleum resins, provides a molded product with reduced mechanical strength and heat resistance (heat distortion temperature), and further has a reduced thermal stability; therefore, aliphatic polyesters including polylactic acid have been of limited application. Further, reduction in thermal stability due to the use of an aliphatic polyester resin, because of its great effect on fluidity of the resin, has made it difficult to achieve stable molding processing conditions, and besides has imposed severe limitations on the molding method, the size of molding machine, and the like. Such characteristics of the aliphatic polyester resin make it difficult to maintain stable physical properties, leading to difficulty in mass production for market deployment, which has been a great obstacle to the future deployment as a more general-purpose resin.

To solve the problems of the aliphatic polyester resin mentioned above, various improvements have hitherto been made. As a method for the improvement, polymer alloy with the existing resin described above and addition of modifiers have been actively carried out.

Patent Document 1 discloses improving mechanical strength and thermal stability by adding a phosphoric acid-based compound to an alloy of a rubber-toughened styrene-based resin, a polycarbonate resin, and a polyester resin and describes the thermal stability of the polycarbonate resin, but does not describe a thermal stability technique for the polyester resin. Thus, the improvement in thermal stability of an alloy of the rubber-toughened styrene-based resin and the polyester resin required further improvement.

Patent Document 2 discloses that both mechanical strength and heat resistance can be improved by alloying an aliphatic polyester resin with a rubber-toughened styrene-based resin and an acrylic-based resin, and further adding dicarboxylic anhydride; however, the thermal stability was poorly investigated, and further improvement was required. Further, it describes that it is preferable to use maleic anhydride or succinic anhydride as dicarboxylic anhydride, but an irritating odor emanates during compounding of the aliphatic polyester resin, the rubber-toughened styrene-based resin, and the acrylic-based resin and during subsequent molding processing, which has been problematic in terms of safety and hygiene considering the influence on human health during the production.

PRIOR ART DOCUMENTS

Patent Documents

Patent Document 1: JP 2007-254507 A
Patent Document 2: JP 2007-191688 A

SUMMARY OF THE INVENTION

Problems to be Solved by the Invention

An object of the present invention is to provide a thermoplastic resin composition of aliphatic polyester resin, the thermoplastic resin composition being excellent in mechanical properties (e.g., impact resistance) and thermal stability, and a molded product thereof without any problem in terms of safety and hygiene.

Means for Solving the Problems

The present inventors intensively studied to solve the problems described above to discover that the problems described above can be solved by providing a thermoplastic resin composition obtained by compounding a styrene-based resin (A), a graft copolymer (B), an aliphatic polyester resin (C), and phosphoric acid and/or monosodium phosphate (D).

Thus the present invention is constituted by the following (1) to (11):

(1) A thermoplastic resin composition obtained by compounding phosphoric acid and/or monosodium phosphate (D) with a resin composition comprising a styrene-based resin (A), a graft copolymer (B), and an aliphatic polyester resin (C);
(2) The thermoplastic resin composition according to (1), wherein the resin composition further includes an acrylic-based resin (E);
(3) The thermoplastic resin composition according to (1) or (2), wherein the aliphatic polyester resin (C) is polylactic acid;
(4) The thermoplastic resin composition according to any one of (1) to (3), comprising 0.01 to 5 parts by weight of the phosphoric acid and/or monosodium phosphate (D) based on 100 parts by weight of the resin composition;
(5) The thermoplastic resin composition according to any one of (1) to (4), comprising 10 to 80 parts by weight of the styrene-based resin (A), 5 to 70 parts by weight of the graft copolymer (B), 1 to 85 parts by weight of the aliphatic polyester resin (C), and 0 to 30 parts by weight of the acrylic-based resin (E) based on 100 parts by weight of the resin composition;
(6) The thermoplastic resin composition according to any one of (1) to (5), wherein the styrene-based resin (A) is obtained by polymerizing at least an aromatic vinyl-based monomer (a1);
(7) The thermoplastic resin composition according to any one of (1) to (6), wherein the graft copolymer (B) is obtained by graft-polymerizing a rubbery polymer (r) with a monomer component comprising at least an unsaturated carboxylic acid alkyl ester-based monomer (b1);

(8) The thermoplastic resin composition according to any one of (2) to (7), wherein the acrylic-based resin (E) is a polymethyl methacrylate-based resin;

(9) A process for producing the thermoplastic resin composition according to any one of (1) to (8), comprising melt-kneading components other than the aliphatic polyester resin (C), adding the aliphatic polyester resin (C), and then melt-kneading the resulting mixture again;

(10) A molded product obtained by molding the thermoplastic resin composition according to any one of (1) to (8); and

(11) A sheet obtained by molding the thermoplastic resin composition according to any one of (1) to (8).

Effects of the Invention

According to the present invention, a thermoplastic resin composition excellent in mechanical properties (e.g., impact resistance), thermal stability, and further molding processability and a molded product thereof can be obtained without any problem in terms of safety and hygiene.

BEST MODE FOR CARRYING OUT THE INVENTION

The thermoplastic resin composition of the present invention will now be described in detail.

The thermoplastic resin composition of the present invention is characterized by compounding phosphoric acid and/or monosodium phosphate (D) with a resin composition including a styrene-based resin (A), a graft copolymer (B), and an aliphatic polyester resin (C).

The styrene-based resin (A) used in the present invention is obtained by subjecting an aromatic vinyl-based monomer (a1) such as styrene, α-methylstyrene, o-methylstyrene, p-methylstyrene, o-ethyl styrene, p-ethylstyrene, or p-t-butylstyrene to known polymerization such as bulk polymerization, bulk-suspension polymerization, solution polymerization, precipitation polymerization, or emulsion polymerization. Preferably, the styrene-based resin (A) is a copolymer obtained by copolymerization of a monomer mixture (a) containing at least the aromatic vinyl-based monomer (a1) and, in addition, an unsaturated carboxylic acid alkyl ester-based monomer (a2), a vinyl cyanide-based monomer (a3), and another vinyl-based monomer (a4) copolymerizable therewith, as required. It should be noted that the styrene-based resin (A) does not include a graft copolymer obtained by graft-polymerizing a rubbery polymer (r) with a monomer component.

Specific examples of the aromatic vinyl-based monomer (a1) constituting the styrene-based resin (A) include, as mentioned above, styrene, α-methylstyrene, o-methylstyrene, p-methylstyrene, o-ethylstyrene, p-ethylstyrene, and p-t-butylstyrene, among which styrene or α-methylstyrene is preferably used. These can be used alone or in combination of two or more.

The unsaturated carboxylic acid alkyl ester-based monomer (a2) constituting the styrene-based resin (A) is preferably, but not limited to, an acrylic acid ester and/or methacrylic acid ester having a $C_1$-$C_6$ alkyl group or substituted alkyl group, and specific examples thereof include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4, 5,6-pentahydroxyhexyl (meth)acrylate, and 2,3,4,5-tetrahydroxypentyl (meth)acrylate, among which methyl methacrylate is most preferably used. These can be used alone or in combination of two or more.

The vinyl cyanide-based monomer (a3) constituting the styrene-based resin (A) is also not particularly limited, and specific examples thereof include acrylonitrile, methacrylonitrile and ethacrylonitrile, among which acrylonitrile is preferably used. These can be used alone or in combination of two or more.

The other vinyl-based monomer (a4) constituting the styrene-based resin (A) is not particularly limited as long as it is copolymerizable with the aromatic vinyl-based monomer (a1), the unsaturated carboxylic acid alkyl ester-based monomer (a2), and the vinyl cyanide-based monomer (a3), and specific examples thereof include maleimide-based monomers such as N-methylmaleimide, N-ethylmaleimide, N-cyclohexylmaleimide, and N-phenylmaleimide; vinyl-based monomers having a carboxyl group or carboxylic anhydride group, such as acrylic acid, methacrylic acid, maleic acid, maleic acid monoethyl ester, maleic anhydride, phthalic acid, and itaconic acid; vinyl-based monomers having a hydroxyl group, such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, and 4,4-dihydroxy-2-butene; vinyl-based monomers having an epoxy group, such as glycidyl acrylate, glycidyl methacrylate, glycidyl ethacrylate, glycidyl itaconate, allyl glycidyl ether, styrene-p-glycidyl ether, and p-glycidyl styrene; vinyl-based monomers having an amino group and a derivative thereof, such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene; and vinyl-based monomers having an oxazoline group, such as 2-isopropenyl-oxazoline, 2-vinyl-oxazoline, 2-acroyl-oxazoline, and 2-styryl-oxazoline. These can be used alone or in combination of two or more.

The compounding ratio of the monomer mixture (a) is preferably 1 to 100% by weight of the aromatic vinyl-based monomer (a1), 0 to 99% by weight of the unsaturated carboxylic acid alkyl ester-based monomer (a2), 0 to 50% by weight of the vinyl cyanide-based monomer (a3), and 0 to 99% by weight of the other vinyl monomer (a4) copolymerizable therewith; more preferably, 10 to 90% by weight of the aromatic vinyl-based monomer (a1), 50 to 90% by weight of the unsaturated carboxylic acid alkyl ester-based monomer (a2), 0 to 40% by weight of the vinyl cyanide-based monomer (a3), and 0 to 50% by weight of the other vinyl-based monomer (a4) copolymerizable therewith; and still more preferably 15 to 80% by weight of the aromatic vinyl-based monomer (a1), 60 to 80% by weight of the unsaturated carboxylic acid alkyl ester-based monomer (a2), 0 to 30% by weight of the vinyl cyanide-based monomer (a3), and 0 to 30% by weight of the other vinyl-based monomer (a4) copolymerizable therewith.

The properties of the styrene-based resin (A) are not restricted, but, preferably, by using a styrene-based resin having an intrinsic viscosity [η] measured at 30° C. by using methyl ethyl ketone solvent of 0.20 to 2.00 dl/g, preferably in the range of 0.25 to 1.50 dl/g, and more preferably in the range of 0.25 to 1.0 dl/g, a thermoplastic resin composition excellent in impact resistance and molding processability can be obtained.

The molecular weight of the styrene-based resin (A) is not restricted, but, preferably, by using a styrene-based resin having a weight average molecular weight measured by gel permeation chromatography (GPC) by using tetrahydrofuran solvent in the range of 10,000 to 400,000 and more preferably in the range of 50,000 to 150,000, a thermoplastic resin composition excellent in impact resistance and molding processability can be obtained.

Specific examples of the styrene-based resin (A) used in the present invention include polystyrene, high-impact polystyrene, AS resin, AAS resin, AES resin, MAS resin, and MS resin. The styrene-based resin (A) used in the present invention can be used alone or in combination of two or more; for example, combined use of a styrene-based resin in which methyl methacrylate is copolymerized as the unsaturated carboxylic acid alkyl ester-based monomer (a2) and a styrene-based resin in which methyl methacrylate is not copolymerized provides a thermoplastic resin composition excellent in all of impact resistance, heat resistance, surface appearance, and colorability.

The graft copolymer (B) used in the present invention is obtained by subjecting a monomer component to known bulk polymerization, bulk-suspension polymerization, solution polymerization, precipitation polymerization, or emulsion polymerization in the presence of a rubbery polymer (r) to graft polymerize the monomer component with the rubbery polymer (r). The graft copolymer (B) can include a polymer of a monomer component without a graft with a rubbery polymer (r) as well as the graft copolymer obtained by graft polymerizing a monomer component with a rubbery polymer (r).

The rubbery polymer (r) is preferably, but is not limited to, those having a glass transition temperature of 0° C. or lower, and, for example, diene-based rubber, acrylic-based rubber, and ethylene-based rubber can be preferably used, specific examples of which include polybutadiene, styrene-butadiene copolymer, styrene-butadiene block copolymer, acrylonitrile-butadiene copolymer, butyl acrylate-butadiene copolymer, polyisoprene, butadiene-methyl methacrylate copolymer, butyl acrylate-methyl methacrylate copolymer, butadiene-ethyl acrylate copolymer, ethylene-propylene copolymer, ethylene-isoprene copolymer, and ethylene-methyl acrylate copolymer. Among these rubbery polymers, polybutadiene, styrene-butadiene copolymer, styrene-butadiene block copolymer, and acrylonitrile-butadiene copolymer are preferably used particularly from the standpoint of impact resistance, and they can be used alone or as a mixture of two or more.

The weight average particle size of the rubbery polymer (r) is not particularly limited, but is preferably in the range of 0.05 to 1.0 µm and particularly preferably 0.1 to 0.5 µm. When the weight average particle size of the rubbery polymer is in the range of 0.05 µm to 1.0 µm, excellent impact resistance can be expressed. Further, the rubbery polymer can be used alone or in combination of two or more, and in terms of impact resistance and fluidity, it is preferable to use two or more rubbery polymers having different weight average particle sizes. For example, so-called bimodal rubber in which a rubbery polymer having a small weight average particle size and a rubbery polymer having a large weight average particle size are used in combination may be used.

The weight average particle size of the rubbery polymer (r) can be measured by the sodium alginate method described in "Rubber Age, Vol. 88, p. 484 to 490, (1960), by E. Schmidt, P. H. Biddison", i.e., determining the particle size at 50% cumulative weight fraction from the weight ratio of creamed polybutadiene and the cumulative weight fraction of sodium alginate concentration by utilizing the fact that the particle size of creamed polybutadiene varies depending on the concentration of sodium alginate.

The gel content of the rubbery polymer (r) is not particularly limited, but in terms of impact resistance and heat resistance, it is preferably 40 to 99% by weight, more preferably 60 to 95% by weight, and particularly preferably 70 to 90% by weight. The gel content can be measured by determining the percentage of insoluble matter after extraction at room temperature for 24 hours using toluene.

The graft copolymer (B) is obtained by graft polymerization of a monomer component preferably in an amount of 20 to 90% by weight and more preferably 30 to 70% by weight in the presence of a rubbery polymer (r) preferably in an amount of 10 to 80% by weight and more preferably 30 to 70% by weight. If the percentage of the rubbery polymer is below or over this range, impact strength and surface appearance can be reduced.

The monomer component constituting the grafting component of the graft copolymer (B) is preferably a monomer mixture (b) that includes at least an unsaturated carboxylic acid alkyl ester-based monomer (b1) and, in addition, contains an aromatic vinyl-based monomer (b2), a vinyl cyanide-based monomer (b3), and another vinyl-based monomer (b4) copolymerizable therewith, as required.

The unsaturated carboxylic acid alkyl ester-based monomer (b1) constituting the graft copolymer (B) is preferably, but not limited to, an acrylic acid ester and/or methacrylic acid ester having a $C_1$-$C_6$ alkyl group or substituted alkyl group. Specific examples thereof include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate, among which methyl methacrylate is most preferably used. These can be used alone or in combination of two or more.

The aromatic vinyl-based monomer (b2) constituting the graft copolymer (B) is not particularly limited, and specific examples thereof include styrene, α-methylstyrene, o-methylstyrene, p-methylstyrene, o-ethylstyrene, p-ethylstyrene, and p-t-butylstyrene, among which styrene and α-methylstyrene are preferably used. These can be used alone or in combination of two or more.

The vinyl cyanide-based monomer (b3) constituting the graft copolymer (B) is not particularly limited, and specific examples thereof include acrylonitrile, methacrylonitrile and ethacrylonitrile, among which acrylonitrile is preferably used. These can be used alone or in combination of two or more.

The other vinyl-based monomer (b4) constituting the graft copolymer (B) is not particularly limited as long as it is copolymerizable the unsaturated carboxylic acid alkyl ester-based monomer (b1), the aromatic vinyl-based monomer (b2), and the vinyl cyanide-based monomer (b3), and specific examples thereof include maleimide-based monomers such as N-methylmaleimide, N-ethylmaleimide, N-cyclohexylmaleimide, and N-phenylmaleimide; vinyl-based monomers having a carboxyl group or carboxylic anhydride group, such as acrylic acid, methacrylic acid, maleic acid, maleic acid monoethyl ester, maleic anhydride, phthalic acid, and itaconic acid; vinyl-based monomers having a hydroxyl group, such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, and 4,4-dihydroxy-2-butene; vinyl-based monomers having an epoxy group, such as glycidyl acrylate, glycidyl methacrylate, glycidyl ethacrylate, glycidyl itaconate, allyl glycidyl ether, styrene-p-glycidyl ether, and p-glycidyl styrene; vinyl-based monomers having an amino group and a derivative thereof, such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene; and vinyl-based monomers having an oxazoline group, such as 2-isopropenyl-oxazoline, 2-vinyl-oxazoline, 2-acroyl-oxazoline, and 2-styryl-oxazoline. These can be used alone or in combination of two or more.

For the composition ratio of the monomer mixture (b), the unsaturated carboxylic acid alkyl ester-based monomer (b1) is preferably 20 to 90% by weight, and more preferably 30 to 80% by weight; the aromatic vinyl-based monomer (b2) is preferably 0 to 70% by weight, and more preferably 0 to 50% by weight; the vinyl cyanide-based monomer (b3) is preferably 0 to 50% by weight, and more preferably 0 to 30% by weight; and the other vinyl-based monomer (b4) copolymerizable therewith is preferably 0 to 70% by weight, and more preferably 0 to 50% by weight.

As mentioned above, the graft copolymer (B) includes a polymer without a graft in addition to a graft copolymer having a structure in which a monomer component is grafted with a rubbery polymer (r). The graft rate of the graft copolymer (B) is not particularly limited, but to obtain a resin composition having excellent impact resistance and brilliance in good balance, it is preferably in the range of 10 to 100% by weight, and particularly preferably 20 to 80% by weight. The graft rate is a value calculated by the following equation.

Graft rate (%)=[(amount of vinyl-based copolymer graft polymerized with rubbery polymer)/(rubber content in graft copolymer)]×100

Although the properties of the polymer without a graft included in the graft copolymer (B) are not particularly limited, the intrinsic viscosity [η] of methyl ethyl ketone-soluble matter of 0.10 to 1.00 dl/g (measured at 30° C.), particularly in the range of 0.20 to 0.80 Mg, is a preferred condition for obtaining a resin composition having excellent impact resistance.

As mentioned above, the graft copolymer (B) can be obtained by a known polymerization method. For example, the graft copolymer (B) can be obtained by carrying out emulsion polymerization by continuously feeding a mixture of a monomer and a chain transfer agent and a solution of a radical initiator dissolved in an emulsifier into a polymerization vessel in the presence of rubbery polymer latex.

Examples of the aliphatic polyester resin (C) used in the present invention include polymers mainly composed of aliphatic hydroxycarboxylic acid, polymers mainly composed of aliphatic polycarboxylic acid and aliphatic polyhydric alcohol, and the like. Specifically, examples of polymers mainly composed of aliphatic hydroxycarboxylic acid include polyglycolic acid, polylactic acid, poly-3-hydroxy butyric acid, poly-4-hydroxy butyric acid, poly-4-hydroxy valeric acid, poly-3-hydroxy hexanoic acid, and polycaprolactone, and examples of polymers mainly composed of aliphatic polycarboxylic acid and aliphatic polyhydric alcohol include polyethylene adipate, polyethylene succinate, polybutylene adipate, and polybutylene succinate. Such aliphatic polyester resins can be used alone or in combination of two or more. Among such aliphatic polyester resins, polymers mainly composed of hydroxycarboxylic acid are preferred, and in particular, polylactic acid is preferably used.

Polylactic acid is a polymer mainly composed of L-lactic acid and/or D-lactic acid, but copolymer components other than lactic acid may be contained as long as the object of the present invention is not impaired. Examples of such other copolymer component units include polycarboxylic acids, polyhydric alcohols, hydroxycarboxylic acids, and lactones. Specifically, for example, polycarboxylic acids such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-naphthalene dicarboxylic acid, 5-sodium sulfoisophthalic acid, and 5-tetrabutylphosphonium sulfoisophthalic acid; polyhydric alcohols such as ethylene glycol, propylene glycol, butanediol, heptanediol, hexanediol, octanediol, nonanediol, decanediol, 1,4-cyclohexanedimethanol, neopentyl glycol, glycerin, trimethylolpropane, pentaerythritol, bisphenol A, aromatic polyhydric alcohols obtained by addition reaction of bisphenol and ethylene oxide, diethylene glycol, triethylene glycol, polyethylene glycol, polypropylene glycol, and polytetramethylene glycol; hydroxycarboxylic acids such as glycolic acid, 3-hydroxy butyric acid, 4-hydroxy butyric acid, 4-hydroxy valeric acid, 6-hydroxy caproic acid, and hydroxybenzoic acid; and lactones such as glycolide, ε-caprolactone glycolide, ε-caprolactone, β-propiolactone, δ-butyrolactone, β- or γ-butyrolactone, pivalolactone, and δ-valerolactone can be used. These copolymer components can be used alone or in combination of two or more.

With respect to the polylactic acid, the optical purity of lactic acid component is preferably higher from the standpoint of heat resistance, and in the total lactic acid component, it is preferred that L-isomers or D-isomers be contained in an amount of 80 mol % or more, more preferably 90 mol % or more, and particularly preferably 95 mol % or more.

Further, in terms of heat resistance and molding processability, using polylactic acid stereocomplex is also one of the preferred embodiments. Examples of methods of forming a polylactic acid stereocomplex include mixing poly-L-lactic acid in which L-isomers constitute 90 mol % or more, preferably 95 mol % or more, and more preferably 98 mol % or more with poly-D-lactic acid in which D-isomers constitute 90 mol % or more, preferably 95 mol % or more, and more preferably 98 mol % or more, for example, by melt-kneading or solution-kneading. Other examples include block-copolymerizing poly-L-lactic acid with poly-D-lactic acid, and block-copolymerizing poly-L-lactic acid with poly-D-lactic acid is preferred in that a polylactic acid stereocomplex can be readily formed.

To produce the aliphatic polyester resin (C), a known polymerization method can be used, and particularly for polylactic acid, direct polymerization from lactic acid, ring-opening polymerization through lactide formation, and the like can be employed.

Although the molecular weight or molecular weight distribution of the aliphatic polyester resin (C) is not particularly limited as long as it actually can be processed by molding, the weight average molecular weight is preferably 10,000 or more, more preferably 40,000 or more, and particularly preferably 80,000 or more. The weight average molecular weight as used herein is a polymethyl methacrylate (PMMA) conversion weight average molecular weight measured by gel permeation chromatography (GPC) using hexafluoroisopropanol as solvent.

The melting point of the aliphatic polyester resin (C) is preferably, but not limited to, 90° C. or higher, and more preferably 150° C. or higher.

In the present invention, the melt viscosity ratio ((A)/(C)) of the styrene-based resin (A) and the aliphatic polyester resin (C) is preferably in the range of 0.1 to 10 because a resin composition with excellent heat resistance can be obtained. The melt viscosity is measured using a capillary graph measuring device (CAPILOGRAPH 1C manufactured by Toyo Seiki Seisaku-Sho, Ltd., orifice length: 20 mm, orifice diameter: 1 mm) at 220° C. and a shear rate of 1000 s$^{-1}$.

In the present invention, in addition to (A) to (C) above, it is preferable to further compound an acrylic-based resin (E) in the resin composition.

The acrylic-based resin (E) used in the present invention is a polymer or copolymer of alkyl (meth)acrylate monomers and a polymer other than the styrene-based resin (A), the graft copolymer (B), and the aliphatic polyester resin (C). Addition of the acrylic resin (E) improves impact resistance.

Examples of alkyl (meth)acrylate-based monomers include methyl methacrylate, methyl acrylate, ethyl acrylate, ethyl methacrylate, butyl acrylate, butyl methacrylate, cyclohexyl methacrylate, hydroxyethyl methacrylate, glycidyl methacrylate, allyl methacrylate, aminoethyl acrylate, propylaminoethyl acrylate, 2-hydroxyethyl acrylate, 2-hydroxypropyl acrylate, glycidyl acrylate, dicyclopentenyloxyethyl acrylate, dicyclopentanyl acrylate, butanediol diacrylate, nonanediol diacrylate, polyethylene glycol diacrylate, Methyl 2-(hydroxymethyl)acrylate, Ethyl 2-(hydroxymethyl)acrylate, methacrylic acid, ethyl methacrylate, butyl methacrylate, cyclohexyl methacrylate, dimethylaminoethyl methacrylate, ethylaminopropyl methacrylate, phenylaminoethyl methacrylate, cyclohexylaminoethyl methacrylate, 2-hydroxyethyl methacrylate, 2-hydroxypropyl methacrylate, glycidyl methacrylate, dicyclopentenyloxyethyl methacrylate, dicyclopentanyl methacrylate, pentamethylpiperidyl methacrylate, tetramethylpiperidyl methacrylate, benzyl methacrylate, ethylene glycol dimethacrylate, propylene glycol dimethacrylate, and polyethylene glycol dimethacrylate, and these can be used alone or in combination of two or more.

Further, copolymers containing a ring structural unit such as a lactone ring, maleic anhydride, or glutaric anhydride in the main chain can also be used.

The acrylic-based resin (E) used in the present invention is preferably a polymethyl methacrylate-based resin mainly composed of methyl methacrylate component units, more preferably a polymethyl methacrylate-based resin including methyl methacrylate component units in an amount of 70% or more, and still more preferably a polymethyl methacrylate (PMMA) resin.

Although the molecular weight or molecular weight distribution of the acrylic-based resin (E) is not particularly limited as long as it actually can be processed by molding, from the standpoint of molding processability, the weight average molecular weight is preferably 1,000 to 450,000, more preferably 10,000 to 200,000, and still more preferably 30,000 to 150,000. The weight average molecular weight as used herein is a polymethyl methacrylate (PMMA) conversion weight average molecular weight measured by GPC using hexafluoroisopropanol as solvent.

In terms of heat resistance, the glass transition temperature of the acrylic-based resin (E) is preferably 60° C. or higher, more preferably 70° C. or higher, still more preferably 80° C. or higher, particularly preferably 90° C. or higher, and most preferably 100° C. or higher. The upper limit is preferably, but not limited to, not higher than 150° C. in terms of moldability. The glass transition temperature as used herein is a glass transition temperature determined by differential scanning calorimetry (DSC) and a temperature at which the value of change in specific heat capacity in a glass transition temperature region is reduced by half.

When using a polymethyl methacrylate resin as the acrylic-based resin (E), the syndiotacticity of the methacryl-based resin is preferably 20% or more, more preferably 30% or more, and still more preferably 40% or more. The upper limit is preferably, but not limited to, 90% or less in terms of moldability. In terms of heat resistance, the heterotacticity is preferably 50% or less, more preferably 40% or less, and still more preferably 30% or less. Further, in terms of heat resistance, the isotacticity is preferably 20% or less, more preferably 15% or less, and still more preferably 10% or less. The syndiotacticity, the heterotacticity, and the isotacticity as used herein are a value calculated from an integrated intensity ratio of linear branched methyl group determined by $^1$H-NMR measurements using deuterated chloroform as solvent.

To produce the acrylic-based resin (E), a known polymerization method such as bulk polymerization, solution polymerization, suspension polymerization, or emulsion polymerization can be used.

Although the compounding ratio of the resin composition in the present invention is not particularly limited, in order to produce the effects of the present invention, the styrene-based resin (A) is preferably 10 to 80 parts by weight, more preferably 15 to 75 parts by weight, still more preferably 20 to 70 parts by weight, and particularly preferably 30 to 60 parts by weight; the graft copolymer (B) is preferably 5 to 70 parts by weight, more preferably 5 to 65 parts by weight, still more preferably 10 to 60 parts by weight, and particularly preferably 10 to 50 parts by weight; the aliphatic polyester resin (C) is preferably 1 to 85 parts by weight, more preferably 5 to 80 parts by weight, and still more preferably 5 to 70 parts by weight; and the acrylic-based resin (E) is preferably 0 to 30 parts by weight, more preferably 1 to 30 parts by weight, and still more preferably 2 to 20 parts by weight, based on 100 parts by weight of the total resin composition.

The thermoplastic resin composition of the present invention is characterized by containing phosphoric acid and/or monosodium phosphate (D) in addition to the resin components described above. The phosphoric acid and/or monosodium phosphate (D) is used for the purpose of improving thermal stability of the resin composition by preventing alkaline degradation of the aliphatic polyester resin (C) due to alkalinization of the graft copolymer (B) during its production process. Further, the phosphoric acid and/or monosodium phosphate (D) is characterized by being superior to already known other neutralizers including organic acids from the standpoint of the influence of irritating odor that emanates during the material blending or melt compounding of the resin composition and during the molding of the resin composition obtained on safety and hygiene of human health, thermal stability of the resin composition, and the like.

In particular, in the case of deployment, for example, in food utensil or toy application that requires safety and hygiene of human health more strictly, it is preferable to use monosodium phosphate. Monosodium phosphate itself has been widely used in the medical field and food additives, and has already been confirmed to be safe when ingested. In addition, monosodium phosphate has been confirmed to be suitable as a resin additive also by Japan Hygienic Olefin And Styrene Plastics Association, a self-regulatory organization for forestalling harm to hygiene resulting, for example, from food utensils (registered on the positive list of additives).

The content of the phosphoric acid and/or monosodium phosphate (D) in the thermoplastic resin composition of the present invention is preferably in the range of 0.01 to 5 parts by weight, more preferably 0.1 to 2 parts by weight, and still more preferably 0.1 to 0.5 parts by weight, based on 100 parts by weight of the total resin composition. When the content of the phosphoric acid and/or monosodium phosphate (D) is less than 0.01 parts by weight, the effect of preventing alkaline degradation of the aliphatic polyester resin (C) is not fully exerted; consequently, the initial impact resistance of the thermoplastic resin composition of the present invention will be reduced, and besides the impact resistance can be significantly reduced in heat holding. When the content is more than 5 parts by weight, foaming of a molded product during heat holding or degradation of surface appearance of a molded product can occur.

Any other acidic substance that is capable of neutralizing the alkalinity of the graft copolymer (B) can be used as long as the substance does not impair the properties of the phosphoric acid and/or monosodium phosphate (D) in the present invention and does not cause influence from the standpoint of safety and hygiene during production. Specific examples thereof include inorganic acids such as hydrochloric acid, sulfuric acid, and nitric acid; organic acids such as acetic acid, oxalic acid, malonic acid, succinic acid, maleic acid, adipic acid, sebacic acid, azelaic acid, dodecanedioic acid, cyclohexanedicarboxylic acid, citric acid, terephthalic acid, isophthalic acid, orthophthalic acid, benzoic acid, trimellitic acid, pyromellitic acid, phenol, naphthalene dicarboxylic acid, and diphenic acid; and acid anhydrides of oxalic acid, malonic acid, succinic acid, maleic acid, adipic acid, sebacic acid, azelaic acid, dodecanedioic acid, citric acid, orthophthalic acid, trimellitic acid, and pyromellitic acid. When using the above-described compounds other than phosphoric acid or monosodium phosphate in combination, they need not necessarily be used alone and can be used in combination.

In the present invention, it is preferable to further contain a crystal nucleating agent from the standpoint of improvement of heat resistance. Crystal nucleating agents that are commonly used as a crystal nucleating agent for polymer may be used without any limitation. Both inorganic-based crystal nucleating agents and organic-based crystal nucleating agents can be used, and they can be used alone or in combination of two or more.

Specific examples of inorganic-based crystal nucleating agents include talc, kaolinite, montmorillonite, mica, synthetic mica, clay, zeolite, silica, graphite, carbon black, zinc oxide, magnesium oxide, calcium oxide, titanium oxide, calcium sulfide, boron nitride, magnesium carbonate, calcium carbonate, barium sulfate, aluminum oxide, neodymium oxide, and metal salts of phenylphosphonate, and talc, kaolinite, montmorillonite, and synthetic mica are preferred from the standpoint of having a great heat resistance-improving effect. These can be used alone or in combination of two or more. These inorganic-based crystal nucleating agents are preferably modified by organic matter in order to enhance the dispersibility in the composition.

The content of the inorganic-based crystal nucleating agents is preferably 0.01 to 100 parts by weight, more preferably 0.05 to 50 parts by weight, and still more preferably 0.1 to 30 parts by weight, based on 100 parts by weight of the aliphatic polyester resin (C).

Specific examples of organic-based crystal nucleating agents include metal salts of organic carboxylic acid such as sodium benzoate, potassium benzoate, lithium benzoate, calcium benzoate, magnesium benzoate, barium benzoate, lithium terephthalate, sodium terephthalate, potassium terephthalate, calcium oxalate, monosodium laurate, potassium laurate, sodium myristate, potassium myristate, calcium myristate, sodium octacosanoate, calcium octacosanoate, monosodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonates such as sodium p-toluenesulfonate and sodium sulfoisophthalate; carboxylic acid amides such as stearic acid amide, ethylene bislauric acid amide, paltimic acid amide, hydroxy stearic acid amide, erucic acid amide, and trimesic acid tris(t-butylamide); polymers such as low-density polyethylene, high-density polyethylene, polypropylene, polyisopropylene, polybutene, poly-4-methylpentene, poly-3-methylbutene-1, polyvinyl cycloalkane, polyvinyl trialkylsilane, and high-melting point polylactic acid; sodium salts or potassium salts of polymer having a carboxyl group (so-called ionomer), such as a sodium salt of ethylene-acrylic acid or -methacrylic acid copolymer and a sodium salt of styrene-maleic anhydride copolymer; benzylidene sorbitol and derivatives thereof; phosphorus compound metal salts such as sodium-2,2'-methylene bis(4,6-di-t-butylphenyl)phosphate; and 2,2-methylbis(4,6-di-t-butylphenyl)sodium. Metal salts of organic carboxylic acid and carboxylic acid amides are preferred from the standpoint of having a great heat resistance-improving effect. These can be used alone or in combination of two or more.

The content of the organic-based crystal nucleating agent is preferably 0.01 to 30 parts by weight, more preferably 0.05 to 10 parts by weight, and still more preferably 0.1 to 5 parts by weight, based on 100 parts by weight of the aliphatic polyester resin (C).

In the present invention, it is preferable to further contain a plasticizer from the standpoint of improving heat resistance. Plasticizers that are commonly used as a plasticizer for polymer may be used without any limitation, and examples thereof include polyester-based plasticizers, glycerin-based plasticizers, polycarboxylic acid ester-based plasticizers, polyalkylene glycol-based plasticizers, and epoxy-based plasticizers, which can be used alone or in combination of two or more.

Specific examples of polyester-based plasticizers include polyesters made from acid components such as adipic acid, sebacic acid, terephthalic acid, isophthalic acid, naphthalene dicarboxylic acid, and diphenyldicarboxylic acid and diol components such as propylene glycol, 1,3-butanediol, 1,4-butanediol, 1,6-hexanediol, ethylene glycol, and diethylene glycol; and polyesters made from hydroxycarboxylic acid such as polycaprolactone. These polyesters may be terminally capped with monofunctional carboxylic acid or monofunctional alcohol, or may be terminally capped, for example, with an epoxy compound.

Specific examples of glycerin-based plasticizers include glycerin monoacetomonolaurate, glycerin diacetomonolaurate, glycerin monoacetomonostearate, glycerin diacetomonooleate, and glycerin monoacetomonomontanate.

Specific examples of polycarboxylic acid-based plasticizers include phthalic acid esters such as dimethyl phthalate, diethyl phthalate, dibutyl phthalate, dioctyl phthalate, diheptyl phthalate, dibenzyl phthalate, and butyl benzyl phthalate; trimellitic acid esters such as tributyl trimellitate, trioctyl trimellitate, and trihexyl trimellitate; adipic acid esters such as diisodecyl adipate and n-octyl-n-decyl adipate; citric acid esters such as acetyl triethyl citrate and acetyl tributyl citrate; azelaic acid esters such as di-2-ethylhexyl azelate; and sebacic acid esters such as dibutyl sebacate and di-2-ethylhexyl sebacate.

Specific examples of polyalkylene glycol-based plasticizers include polyalkylene glycols such as polyethylene glycol, polypropylene glycol, poly(ethylene oxide/propylene oxide) block and/or random copolymer, polytetramethylene glycol, ethylene oxide addition polymer of bisphenols, propylene oxide addition polymer of bisphenols, and tetrahydrofuran addition polymer of bisphenols; and terminally-capped compounds thereof such as a terminally epoxidized compound, a terminally esterified compound, and a terminal etherified compound.

"Epoxy-based plasticizers" generally refers to epoxy triglyceride composed of alkyl epoxy stearate and soybean oil, but, in addition, so-called epoxy resin which is mainly composed of bisphenol A and epichlorohydrin can also be used as a plasticizer.

Specific examples of other plasticizers include benzoic acid esters of aliphatic polyol such as neopentyl glycol dibenzoate, diethylene glycol dibenzoate, and triethylene glycol di-2-ethyl butyrate; fatty acid amides such as stearic acid amide; aliphatic carboxylic acid esters such as butyl oleate; oxy acid esters such as methyl acetyl ricinoleate and butyl acetyl ricinoleate; pentaerythritol; sorbitols; polyacrylic acid esters; silicone oil, and paraffins.

Plasticizers preferably used in the present invention are particularly preferably at least one selected from polyester-based plasticizers and polyalkylene glycol-based plasticizers among those which were listed above.

The content of the plasticizers is preferably in the range of 0.01 to 30 parts by weight, more preferably in the range of 0.1 to 20 parts by weight, and still more preferably in the range of 0.5 to 10 parts by weight, based on 100 parts by weight of the aliphatic polyester resin (C).

In the present invention, crystal nucleating agents and plasticizers may be used individually, but it is preferable to use them in combination.

In the present invention, it is preferable to further contain a filler other than inorganic-based crystal nucleating agents from the standpoint of improving heat resistance. As a filler other than inorganic-based crystal nucleating agents, fibrous, plate-like, granular, and powdery fillers commonly used to reinforce thermoplastic resins can be used. Specific examples thereof include inorganic fibrous fillers such as glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, zonolite, ellestadite, gypsum fibers, silica fibers, silica/alumina fibers, zirconia fibers, boron nitride fibers, silicon nitride fibers, and boron fibers; organic fibrous fillers such as polyester fibers, nylon fibers, acryl fibers, regenerated cellulose fibers, acetate fibers, kenaf, ramie, cotton, jute, hemp, sisal, flax, linen, silk, Manila hemp, sugar cane, wood pulp, wastepaper, used paper, and wool; and plate-like or granular fillers such as glass flakes, graphite, metal foil, ceramic beads, sericite, bentonite, dolomite, finely divided hydrated silica, feldspar powder, potassium titanate, Shirasu balloon, aluminum silicate, silicon oxide, gypsum, novaculite, dawsonite, and white clay. Among these fillers, inorganic fibrous fillers are preferred, and glass fibers and wollastonite are particularly preferred. The use of organic fibrous fillers is also preferred, and natural fibers and regenerated fibers are more preferred from the standpoint of making use of biodegradability of the aliphatic polyester resin (C). The aspect ratio (average fiber length/average fiber diameter) of the fibrous fillers to be compounded is preferably 5 or more, more preferably 10 or more, and still more preferably 20 or more.

The fillers described above may be coated or bundled with a thermoplastic resin such as ethylene/vinyl acetate copolymer or a thermosetting resin such as an epoxy resin, or may be treated, for example, with a coupling agent such as aminosilane or epoxysilane.

The content of the fillers is preferably 0.1 to 200 parts by weight and more preferably 0.5 to 100 parts by weight, based on 100 parts by weight of the aliphatic polyester resin (C).

In the present invention, it is preferable to further contain a carboxyl group-reactive end capping agent from the standpoint of inhibiting hydrolysis of the aliphatic polyester resin (C) to thereby improve heat resistance and durability. There is no limitation on the carboxyl group-reactive end capping agent, as long as it is a compound that is able to cap the carboxyl end group of a polymer, and those which are used as a capping agent for the carboxyl end of a polymer can be used. In the present invention, such a carboxyl group-reactive end capping agent is able to cap not only the end of the aliphatic polyester resin (C) but also carboxyl groups of acidic low-molecular-weight compounds such as lactic acid and formic acid resulting, for example, from pyrolysis or hydrolysis of a naturally-occurring organic filler. Further, the end capping agent is more preferably a compound that is also able to cap the hydroxyl group end forming an acidic low-molecular-weight compound by pyrolysis.

As such a carboxyl group-reactive end capping agent, at least one compound selected from epoxy compounds, oxazoline compounds, oxazine compounds, carbodiimide compounds, and isocyanate compounds is preferably used, among which epoxy compounds and/or carbodiimide compounds are preferred.

The content of the carboxyl group-reactive end capping agent is preferably in the range of 0.01 to 10 parts by weight and more preferably in the range of 0.05 to 5 parts by weight, based on 100 parts by weight of the aliphatic polyester resin (C).

Although the timing of addition of the carboxyl group-reactive end capping agent is not particularly limited, it is preferable to melt-knead with the aliphatic polyester resin (C) in advance and then knead with the others because not only heat resistance but also mechanical properties and thermal stability can be improved.

In the present invention, stabilizers (e.g., antioxidants, UV absorbers, and anti-weathering agents), lubricants, mould releasing agents, flame retardants, coloring agents including dyes or pigments, antistatic agents, foaming agents, and the like can be added as long as the object of the present invention is not impaired.

In the present invention, at least one of other thermoplastic resins (e.g., polyamide resin, polyphenylene sulfide resin, polyether ether ketone resin, polyester resin other than the aliphatic polyester resin (C), polysulfone resin, polyethersulfone resin, aromatic and aliphatic polycarbonate resin, polyarylate resin, polyphenylene oxide resin, polyacetal resin, polyimide resin, polyetherimide resin, aromatic and aliphatic polyketone resin, fluororesin, polyvinyl chloride-based resin, polyvinylidene chloride resin, vinyl ester-based resin, cellulose acetate resin, and polyvinyl alcohol resin), thermosetting resins (e.g., phenol resin, melamine resin, polyester resin, silicone resin, and epoxy resin), and the like can be further contained as long as the object of the present invention is not impaired. Compounding such resins provides a molded product having excellent properties.

The various additives described above that can be added to the thermoplastic resin composition of the present invention can be added at any time during the production of the thermoplastic resin composition of the present invention, and examples of the method of addition include adding simultaneously when resin components are compounded and adding after melt-kneading resins of at least two components in advance.

Examples of the process for producing the thermoplastic resin composition of the present invention include blending in advance a resin component, phosphoric acid and/or monosodium phosphate (D), and, if necessary, crystal nucleating agents, plasticizers, fillers, and other additives, and then melt-kneading the blending uniformly in a single-screw or twin-screw extruder at or higher than the melting point of the resin component; and mixing in a solution, and then removing solvent. When the thermoplastic resin composition is produced by mixing the above components, an aliphatic polyester resin (C) can undergo alkaline degradation depending on the component mixed, and, therefore, it is preferable to produce pellets in advance by kneading a graft copolymer (B) and phosphoric acid and/or monosodium phosphate (D) in order to inhibit the alkaline degradation of the aliphatic polyester resin (C).

Further, when the thermoplastic resin composition is produced for the purpose of molding into an extrusion-molded product such as a sheet, it is preferable to produce the thermoplastic resin composition of the present invention by melt-kneading components other than an aliphatic polyester resin (C), adding the aliphatic polyester resin (C), and then melt-kneading the resulting mixture again. This method will be described by way of specific example: resin components other than an aliphatic polyester resin (C), phosphoric acid and/or monosodium phosphate (D), and crystal nucleating agents, plasticizers, fillers, and other additives described above are fed through a top feed throat (main raw material feed side) of a twin-screw extruder; then, the aliphatic polyester resin (C) is fed through a side feed throat (auxiliary material feed side) located near the center of the full length of a barrel of the twin-screw extruder; and the resulting mixture is further melt-kneaded to provide a thermoplastic resin composition. Surface appearance may be important in the case of a molded product such as a sheet, and generation of spots which cause impaired surface appearance can be reduced by this method.

The thermoplastic resin composition of the present invention, in general, can be molded by any method such as known injection molding, extrusion molding, inflation molding, and blow molding, and can be widely used as a molded product of any shape. The molded product is a film, sheet, fiber/cloth, nonwoven fabric, injection-molded product, extrusion-molded product, vacuum pressure-molded product, blow molded-product, composite with other materials, or the like, and is useful in applications such as automobile materials, electrical/electronic equipment materials, agricultural materials, gardening materials, fishing materials, civil engineering and construction materials, stationery, medical supplies, toilet seat, and miscellaneous goods.

EXAMPLES

Examples will be given below in order to describe the present invention more specifically and in more detail, but the present invention is not limited to these examples. Unless otherwise specified, "%" means % by weight.

The evaluation method used in the examples will now be described.

(1) Intrinsic Viscosity [η] of Methyl Ethyl Ketone-Soluble Matter of Styrene-Based Resin (A) and Graft Copolymer (B)

As a sample for measurement, 0.2 g/100 ml of methyl ethyl ketone solvent and 0.4 g/100 ml of methyl ethyl ketone solvent were used, and the viscosity was measured at 30° C. using an Ubbelohde viscometer.

(2) Weight Average Particle Size of Rubbery Polymer (r) in Graft Copolymer (B)

The particle size at 50% cumulative weight fraction was determined by the sodium alginate method described in "Rubber Age, Vol. 88, p. 484 to 490, (1960), by E. Schmidt, P. H. Biddison", i.e., from the weight ratio of creamed polybutadiene and the cumulative weight fraction of sodium alginate concentration by utilizing the fact that the particle size of creamed polybutadiene varies depending on the concentration of sodium alginate.

(3) Graft Rate of Graft Copolymer (B)

To a predetermined amount (m; 1 g) of a rubber-containing graft copolymer (A) vacuum-dried at a temperature of 80° C. for 4 hours, 100 ml of acetone was added, and the resulting mixture was refluxed in a hot water bath at a temperature of 70° C. for 3 hours. The solution was centrifuged at 8800 r.p.m. (10000 G) for 40 minutes, and then insoluble matter was filtered off. The insoluble matter was vacuum-dried at a temperature of 80° C. for 4 hours, and the weight (n) was measured. The graft rate was calculated by the following equation, wherein L is the rubber content of a rubber-containing graft copolymer.

$$\text{Graft rate } (\%) = \{[(n)-(m) \times L]/[(m) \times L]\} \times 100$$

(4) Weight Average Molecular Weight

The weight average molecular weight of polylactic acid, an aliphatic polyester resin (C), was measured as a polymethyl methacrylate (PMMA) conversion weight average molecular weight that is measured under conditions of a flow rate of 1 ml/min and a column temperature of 40° C. using a gel permeation chromatography (GPC) apparatus available from Water, a differential refractive index detector (Water 2414) as a detector, two columns MIXED-B available from Polymer Laboratories, and hexafluoroisopropanol as eluent. The weight average molecular weight of methyl ethyl soluble matter of a styrene-based resin (A) and a graft copolymer (B) was measured using the same apparatus/conditions as in the measurement of polylactic acid except using tetrahydrofuran as eluent.

(5) Charpy Impact Strength

Measurements were made in accordance with ISO 179. The conditions for molding a test piece were a cylinder temperature of 220° C. and a mold temperature of 60° C.

(6) MFR Measurement

Measurements were made in accordance with ISO 1133 (measured under conditions of temperature: 220° C. and load: 98 N).

(7) Heat Resistance Evaluation (Measurement of Heat Distortion Temperature)

Heat distortion temperature was measured in accordance with ISO 75-1, 2. The conditions for molding a test piece were a cylinder temperature of 220° C. and a mold temperature of 60° C.

(8) Charpy Impact Strength after Heat Holding

A test piece was molded under conditions of holding at a cylinder temperature of 220° C. for 10 minutes and injection into a mold whose temperature was adjusted to 60° C. The subsequent procedure was performed in accordance with ISO 179.

(9) MFR Measurement after Heat Holding

The MFR of a sample subjected to holding in a cylinder for further 10 minutes in addition to the conditions of MFR measurement in (6) above was measured.

(10) Thermal Stability Evaluation

For Charpy impact strength and MFR, the initial value and the value after heat holding were taken as (I) and (H), respectively, and durability to heat holding was evaluated by the rates of change calculated by the following equations. The smaller the rate of change is, the more excellent the thermal stability is.

Rate of change in Charpy impact strength (%)=((($I$)−($H$))/($I$))×100

Rate of change in MFR (%)=(($H$)−($I$))/($I$)×100

(11) Sheet Spot Evaluation

A pellet of a thermoplastic resin composition was sandwiched between metal molds, and melted by hot press at 220° C. for 3 minutes with a pressure-pressing machine. The resulting melt was stretched to form a sheet of 100 mm long and 300 mm wide with a thickness of 0.3 to 0.5 μm. The appearance of the sheet was visually evaluated: "+" denotes the absence of spots in this area, and "−" denotes the presence of spots.

(12) Evaluation of Safety and Hygiene

Emanation of irritating odor during melt compounding and during injection molding of a pellet obtained was checked.

Raw materials, production process, etc. used in examples will now be described.

[Styrene-Based Resin (A)]

<Process for Producing (A)-1>

To a 20-L stainless-steel autoclave equipped with baffles and a Pfaudler impeller, a solution obtained by dissolving 0.05 parts by weight of methyl methacrylate/acrylamide copolymer (described in JP 45-24151 B) in 165 parts by weight of ion exchanged water was added and stirred at 400 rpm, and the system was replaced with nitrogen gas. Thereafter, the following mixed materials were added with stirring in the reaction system, and the temperature was raised to 60° C. to initiate polymerization.

Styrene: 70 parts by weight
Acrylonitrile: 30 parts by weight
t-dodecyl mercaptan: 0.33 parts by weight
2,2'-azobisisobutyronitrile: 0.31 parts by weight The reaction temperature was raised to 65° C. over 30 minutes and then to 100° C. over 120 minutes. Thereafter, cooling of the reaction system, polymer isolation, washing, and drying were carried out according to a conventional method to thereby obtain a polymer in the form of beads. For the styrene-based resin obtained, the intrinsic viscosity of methyl ethyl ketone-soluble matter was 0.53 dl/g, and the weight average molecular weight was 134,000.

<Process for Producing (A)-2>

Suspension polymerization was carried out in the same manner as in the case of (A)-1 above except that the amount of 2,2'-azobisisobutyronitrile was changed from 0.31 parts by weight to 0.15 parts by weight. For the styrene-based resin obtained, the intrinsic viscosity of methyl ethyl ketone-soluble matter was 0.89 dl/g, and the weight average molecular weight was 351,000.

<Process for Producing (A)-3>

Suspension polymerization was carried out in the same manner as in the case of (A)-1 above except that the monomer components were changed to 70 parts by weight of methyl methacrylate, 25 parts by weight of styrene, and 5 parts by weight of acrylonitrile. For the styrene-based resin obtained, the intrinsic viscosity of methyl ethyl ketone-soluble matter was 0.35 dl/g, and the weight average molecular weight was 105,000.

<Process for Producing (A)-4>

Suspension polymerization was carried out in the same manner as in the case of (A)-1 above except that the monomer components were changed to 67 parts by weight of methyl methacrylate, 20 parts by weight of styrene, and 13 parts by weight of acrylonitrile, the amount of t-dodecyl mercaptan was changed from 0.33 parts by weight to 0.35 parts by weight, and the amount of 2,2'-azobisisobutyronitrile from 0.31 parts by weight to 0.4 parts by weight. For the styrene-based resin obtained, the intrinsic viscosity of methyl ethyl ketone-soluble matter was 0.46 dl/g, and the weight average molecular weight was 114,000.

[Graft Copolymer (B)]

<Process for Producing (B)-1>

Polybutadiene (weight average particle size: 0.35 μm, gel content: 75%): 50 parts by weight
("Nipol LX111A2" available from ZEON CORPORATION) (solids content equivalent)
Potassium oleate: 0.5 parts by weight
Glucose: 0.5 parts by weight
Monosodium pyrophosphate: 0.5 parts by weight
Ferrous sulfate: 0.005 parts by weight
Deionized water: 120 parts by weight The materials described above were charged to a polymerization vessel, and the temperature was raised to 65° C. with stirring. Polymerization was considered to have started when the inner temperature reached 65° C., and 35 parts by weight of styrene, 15 parts by weight of acrylonitrile, and 0.3 parts by weight of t-dodecyl mercaptan were continuously added dropwise over 5 hours. In parallel, an aqueous solution containing 0.25 parts by weight of cumene hydroperoxide, 2.5 parts by weight of potassium oleate, and 25 parts by weight of pure water was continuously added dropwise over 7 hours to complete the reaction. The resulting graft copolymer latex was solidified with sulfuric acid, neutralized with caustic soda, washed, filtered, and dried into a powder. For the graft copolymer obtained, the graft rate was 50%, the intrinsic viscosity of methyl ethyl ketone-soluble matter was 0.30 dl/g, and the weight average molecular weight was 83,000.

<B-2>

Emulsion polymerization was carried out in the same manner as in the case of (B)-1 above except that the monomer components were changed to 35 parts by weight of methyl methacrylate, 12.5 parts by weight of styrene, 2.5 parts by weight of acrylonitrile. For the graft copolymer obtained, the graft rate was 45%, the intrinsic viscosity of methyl ethyl ketone-soluble matter was 0.28 dl/g, and the weight average molecular weight was 75,000.

[Aliphatic Polyester Resin (C)]
<C-1> Polylactic Acid
Polylactic acid available from NatureWorks (poly-L-lactic acid with a weight average molecular weight of 200,000, a D-lactic acid unit of 1%, and a melting point of 175° C.)
[Phosphoric Acid and/or Monosodium Phosphate (D)]
<(D)-1> Phosphoric acid (0.5 mol/L aqueous solution) (available from KANTO KAGAKU)
<(D)-2> Monosodium phosphate anhydride (available from Taihei Chemical Industrial Co., Ltd.)
[Acrylic-based Resin (E)]
<(E)-1> Polymethyl methacrylate resin ("SUMIPEX MH" available from Sumitomo Chemical Co., Ltd.)
[Dicarboxylic Anhydride (F)]
In Comparative Examples 1 to 5, the dicarboxylic anhydrides (F) below were used in place of phosphoric acid and/or monosodium phosphate (D).
<(F)-1> Maleic anhydride (available from Tokyo Chemical Industry Co., Ltd.)
<(F)-2> Succinic anhydride (available from Tokyo Chemical Industry Co., Ltd.)
[Phosphoric Acid-Based Compound (G)]
In Comparative Examples 6 to 7, the phosphoric acid compounds (G) below were used in place of phosphoric acid and/or monosodium phosphate (D).
<(G)-1> Mixture of octadecyl dihydrogen phosphate and dioctadecyl phosphate ("ADK STAB AX-71" available from Asahi Denka Kogyo K.K.)
<(G)-2> Trisodium phosphate (available from YONEYAMA CHEMICAL INDUSTRY CO., LTD.)

Examples 1 to 17, Comparative Examples 1 to 9

Raw materials of compositions (parts by weight) shown in Table 1 and Table 2 were dry blended, and then melt-kneaded using a twin-screw extruder ("TEX-30" manufactured by Japan Steel Works, LTD.) set at an extrusion temperature of 220° C., and pelletized. The pellet obtained was injection molded using an injection molding machine ("IS55EPN Injection Molding Machine" manufactured by TOSHIBA MACHINE CO., LTD.) under conditions of a molding temperature of 220° C. and a mold temperature of 60° C. to thereby obtain a test piece, which was evaluated for various properties. The evaluation results are shown in Table 1 and Table 2. As is evident from the results of Examples 1 to 17, the thermoplastic resin composition of the present invention is excellent in mechanical properties (e.g., impact resistance) and thermal stability, and besides excellent in safety and hygiene during the time from production of the thermoplastic resin composition to obtaining of a molded final product because of no irritating odor during melt compounding and molding.

Examples 18 to 20

With respect to the compositions of Example 9, 10, and 12, components other than an aliphatic polyester resin (C) were dry blended, melt-kneaded using a twin-screw extruder ("TEX-30" manufactured by Japan Steel Works, LTD.) set at an extrusion temperature of 220° C., further melt-kneaded after feeding the aliphatic polyester resin (C) through a side feed of the extruder, and pelletized. The pellet obtained was injection molded using an injection molding machine ("IS55EPN Injection Molding Machine" manufactured by TOSHIBA MACHINE CO., LTD.) under conditions of a molding temperature of 220° C. and a mold temperature of 60° C. to thereby obtain a test piece, which was evaluated for various properties. The evaluation results are as shown in Table 1. Although the thermal stability and the impact resistance of Examples 18 to 20 were equivalent to those of Example 9, 10, and 12, for the surface appearance (sheet spot evaluation), excellent results were obtained compared to Example 9, 10, and 12.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Styrene-based Resin (A) | (A)-1 | 71 | 68 | 68 | | 49 | 49 | 29 | 9 | 9 | 9 |
| | (A)-2 | | | | | | | 11 | 11 | 11 | 26 |
| | (A)-3 | | | 3 | | | 2 | | | | |
| | (A)-4 | | | | 70 | | | | | | |
| Graft Copolymer (B) | (B)-1 | 24 | 24 | 24 | | | | | 30 | 30 | |
| | (B)-2 | | | | 25 | 19 | 19 | | | 30 | 30 |
| Aliphatic Polyester (C) | (C)-1 | 5 | 5 | 5 | 5 | 30 | 30 | 30 | 30 | 30 | 30 |
| Acrylic-based Resin (E) | (E)-1 | | 3 | | | 2 | | | 20 | 20 | 5 |
| Phosphoric Acid, Monosodium Phosphate (D) | (D)-1 | 0.1 | 0.1 | | | | | | | | 0.12 |
| | (D)-2 | | | 0.21 | 0.21 | 0.18 | 0.18 | 0.25 | 0.25 | 0.25 | |

TABLE 1-continued

| | | | | | | | | | | |
|---|---|---|---|---|---|---|---|---|---|---|
| Pelletization | All Components Dry Blended | ←→ | | | | | | | | |
| | Only Aliphatic Polyester (C) Fed through Side Feed | | | | | | | | | |
| Initial Properties | Charpy Impact Strength (kJ/m²) | 18 | 28 | 24 | 17 | 12 | 10 | 11 | 16 | 22 | 28 |
| | MFR (g/10 min) | 20 | 18 | 18 | 23 | 35 | 35 | 17 | 18 | 23 | 13 |
| | Heat Distortion Temperature (° C.) | 86 | 87 | 87 | 83 | 61 | 61 | 60 | 63 | 62 | 62 |
| Properties after Heat Holding | Charpy Impact Strength after Heat Holding (kJ/m²) | 16 | 27 | 23 | 16 | 11 | 9 | 10 | 14 | 19 | 25 |
| | MFR after Heat Holding (g/10 min) | 21 | 19 | 18 | 24 | 38 | 37 | 20 | 21 | 25 | 15 |
| Thermal Stability Evaluation | Rate of Change in Charpy Impact Strength (%) | 11.1 | 3.6 | 4.2 | 5.9 | 8.3 | 10.0 | 9.1 | 12.5 | 13.6 | 10.7 |
| | Rate of Change in MFR (%) | 5.0 | 5.6 | 0.0 | 4.3 | 8.6 | 5.7 | 17.6 | 16.7 | 8.7 | 15.4 |
| Odor during Melt Compounding/Molding | | Not Detected | Not Detected | Not Detected | Not Detected | Not Detected | Not Detected | Not Detected | Not Detected | Not Detected | Not Detected |
| Sheet Spot Evaluation | Relative Comparison of Appearance by Visual Observation | - | - | - | - | - | - | - | - | - | - |

| | | Examples | | | | | | | | | |
|---|---|---|---|---|---|---|---|---|---|---|---|
| | | 11 | 12 | 13 | 14 | 15 | 16 | 17 | 18 | 19 | 20 |
| Styrene-based Resin (A) | (A)-1 | | | | 22 | 17 | | | 9 | 9 | |
| | (A)-2 | | | | | | | | 11 | 26 | |
| | (A)-3 | 38 | 38 | 32 | | | 30 | | | | 38 |
| | (A)-4 | | | | | | | 30 | | | |
| Graft Copolymer (B) | (B)-1 | 32 | | | | | | | | | |
| | (B)-2 | | 32 | 38 | 28 | 28 | 10 | 10 | 30 | 30 | 32 |
| Aliphatic Polyester (C) | (C)-1 | 30 | 30 | 30 | 50 | 50 | 60 | 60 | 30 | 30 | 30 |
| Acrylic-based Resin (E) | (E)-1 | | | | | 5 | | | 20 | 5 | |

TABLE 1-continued

| | | | | | | | | | | | |
|---|---|---|---|---|---|---|---|---|---|---|---|
| Phosphoric Acid, Monosodium Phosphate (D) | (D)-1 | | | | | | | | 0.12 | |
| | (D)-2 | 0.32 | 0.32 | 0.32 | 0.25 | 0.25 | 0.1 | 0.1 | 0.25 | | 0.32 |
| Pelletization | All Components Dry Blended | ←———————————————————→ | | | | | | | | | |
| | Only Aliphatic Polyester (C) Fed through Side Feed | | | | | | | | ←————→ | | |
| Initial Properties | Charpy Impact Strength (kJ/m²) | 25 | 30 | 36 | 25 | 35 | 11 | 15 | 22 | 29 | 30 |
| | MFR (g/10 min) | 30 | 30 | 25 | 28 | 30 | 40 | 38 | 22 | 13 | 30 |
| | Heat Distortion Temperature (° C.) | 61 | 62 | 60 | 61 | 59 | 59 | 60 | 61 | 62 | 62 |
| Properties after Heat Holding | Charpy Impact Strength after Heat Holding (kJ/m²) | 23 | 29 | 34 | 23 | 31 | 10 | 13 | 19 | 25 | 30 |
| | MFR after Heat Holding (g/10 min) | 32 | 32 | 28 | 30 | 34 | 43 | 41 | 23 | 15 | 32 |
| Thermal Stability Evaluation | Rate of Change in Charpy Impact Strength (%) | 8.0 | 3.3 | 5.6 | 8.0 | 11.4 | 9.1 | 13.3 | 13.6 | 13.8 | 0.0 |
| | Rate of Change in MFR (%) | 6.7 | 6.7 | 12.0 | 7.1 | 13.3 | 7.5 | 7.9 | 4.5 | 15.4 | 6.7 |
| Odor during Melt Compounding/Molding | | Not Detected | Not Detected | Not Detected | Not Detected | Not Detected | Not Detected | Not Detected | Not Detected | Not Detected | Not Detected |
| Sheet Spot Evaluation | Relative Comparison of Appearance by Visual Observation | - | - | - | - | - | - | - | + | + | + |

TABLE 2

| | | Comparative Examples | | | | | | | | |
|---|---|---|---|---|---|---|---|---|---|---|
| | | 1 | 2 | 3 | 4 | 5 | 6 | 7 | 8 | 9 |
| Styrene-based Resin (A) | (A)-1 | 9 | | | 9 | | 9 | | 70 | 9 |
| | (A)-2 | 11 | | | 11 | | 11 | | | 11 |
| | (A)-3 | | 38 | 38 | | 38 | | 38 | | |
| | (A)-4 | | | | | | | | | |
| Graft Copolymer (B) | (B)-1 | | | | | | | | | |
| | (B)-2 | 30 | 32 | 32 | 30 | 32 | 30 | 32 | | 30 |
| Aliphatic Polyester (C) | (C)-1 | 30 | 30 | 30 | 30 | 30 | 30 | 30 | 30 | 30 |
| Acrylic-based Resin (E) | (E)-1 | 20 | | | 20 | | 20 | | | 20 |
| Phosphoric Acid, Monosodium Phosphate (D) | (D)-1 | | | | | | | | | |
| | (D)-2 | | | | | | | | 0.2 | |
| Dicarboxylic Anhydride (F) | (F)-1 | 0.2 | 0.2 | 0.4 | | | | | | |
| | (F)-2 | | | | 0.2 | 0.4 | | | | |

TABLE 2-continued

| | | | | | | | | | | |
|---|---|---|---|---|---|---|---|---|---|---|
| Phosphoric Acid-based Compound (G) | (G)-1 | | | | | | 0.25 | | | |
| | (G)-2 | | | | | | | 0.32 | | |
| Pelletization | All Components Dry Blended | ← | | | | | | | | → |
| Initial Properties | Charpy Impact Strength (kJ/m²) | 20 | 28 | 29 | 19 | 30 | 15 | 18 | 3 | 14 |
| | MFR (g/10 min) | 25 | 32 | 30 | 24 | 31 | 32 | 40 | 40 | 34 |
| | Heat Distortion Temperature (° C.) | 62 | 62 | 62 | 61 | 61 | 60 | 59 | 66 | 60 |
| Properties after Heat Holding | Charpy Impact Strength after Heat Holding (kJ/m²) | 10 | 19 | 23 | 9 | 22 | 9 | 8 | 2 | 6 |
| | MFR after Heat Holding (g/10 min) | 40 | 42 | 39 | 41 | 40 | 40 | 64 | 42 | 45 |
| Thermal Stability Evaluation | Rate of Change in Charpy Impact Strength (%) | 50.0 | 32.1 | 20.7 | 52.6 | 26.7 | 40.0 | 55.6 | 33.3 | 57.1 |
| | Rate of Change in MFR (%) | 60.0 | 31.3 | 30.0 | 70.8 | 29.0 | 25.0 | 60.0 | 5.0 | 32.4 |
| Odor during Melt Compounding/Molding | | Detected | Detected | Very Strong | Detected | Very Strong | Not Detected | Not Detected | Not Detected | Not Detected |
| Sheet Spot Evaluation | Relative Comparison of Appearance by Visual Observation | - | - | - | - | - | - | - | - | - |

Industrial Applicability

The thermoplastic resin composition of the present invention can be used as a film, sheet, fiber/cloth, nonwoven fabric, injection-molded product, extrusion-molded product, vacuum pressure-molded product, blow molded-product, composite with other materials, or the like because of having excellent impact resistance, thermal stability, and further molding processability, and is useful in applications such as automobile materials, electrical/electronic equipment materials, agricultural materials, gardening materials, fishing materials, civil engineering and construction materials, stationery, medical supplies, toilet seat, miscellaneous goods, or other applications.

The invention claimed is:

1. A thermoplastic resin composition obtained by compounding phosphoric acid and/or monosodium phosphate (D) with a resin composition comprising:
   a styrene-based resin (A),
   a graft copolymer (B), and
   a polylactic acid (C).

2. The thermoplastic resin composition according to claim 1, wherein the resin composition further comprises an acrylic-based resin (E).

3. The thermoplastic resin composition according to claim 1, comprising 0.01 to 5 parts by weight of the phosphoric acid and/or monosodium phosphate (D) based on 100 parts by weight of the resin composition.

4. The thermoplastic resin composition according to claim 1, comprising 10 to 80 parts by weight of the styrene-based resin (A), 5 to 70 parts by weight of the graft copolymer (B), 1 to 85 parts by weight of the polylactic acid (C), and further comprising 0 to 30 parts by weight of an acrylic-based resin (E) based on 100 parts by weight of the resin composition.

5. The thermoplastic resin composition according to claim 1, wherein the styrene-based resin (A) is obtained by polymerizing at least an aromatic vinyl-based monomer (a1).

6. The thermoplastic resin composition according to claim 1, wherein the graft copolymer (B) is obtained by graft-polymerizing a rubbery polymer (r) with a monomer component comprising at least an unsaturated carboxylic acid alkyl ester-based monomer (b1).

7. The thermoplastic resin composition according to claim 2, wherein the acrylic-based resin (E) is a polymethyl methacrylate-based resin.

8. A process for producing a thermoplastic resin composition comprising: a styrene-based resin (A), a graft copolymer (B), an aliphatic polyester resin (C), and a phosphoric acid and/or monosodium phosphate (D),
   wherein the process comprises melt-kneading components other than the aliphatic polyester resin (C), adding the aliphatic polyester resin (C), and then melt-kneading the resulting mixture again.

9. A molded product obtained by molding the thermoplastic resin composition according to claim 1.

10. A sheet obtained by molding the thermoplastic resin composition according to claim 1.

11. The process according to claim 8, wherein the aliphatic polyester resin (C) is a polylactic acid.

* * * * *